Nov. 19, 1963  S. MESSERSCHMIDT  3,110,953
METHOD FOR THE PRODUCTION OF ROUND, PROFILED
MOULDINGS, PARTICULARLY FOR BALL
BEARING RACES
Filed Feb. 25, 1960
FIG.1
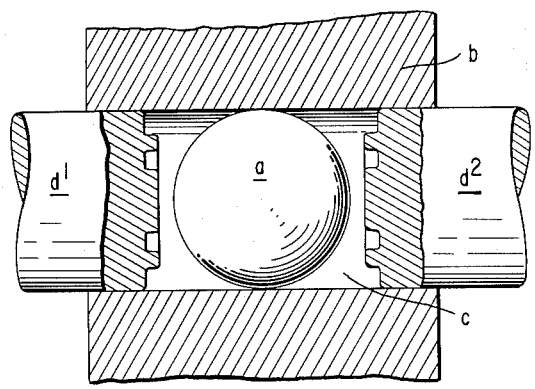
FIG.2
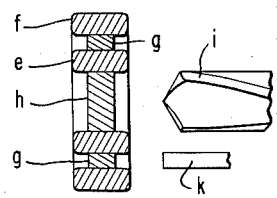
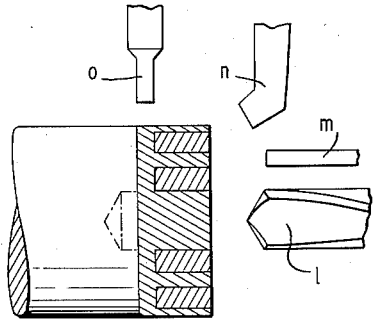
FIG.3
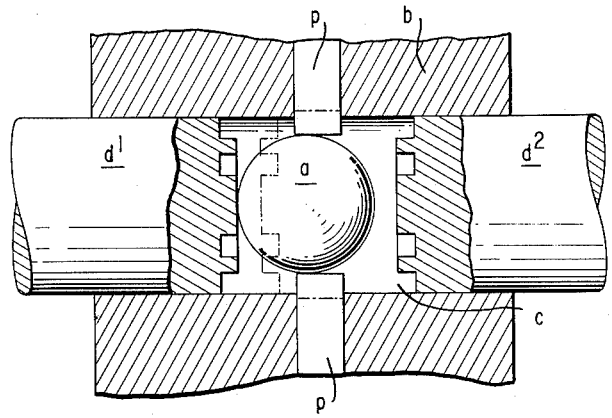
FIG.4
INVENTOR.
SEBASTIAN MESSERSCHMIDT
BY Paul M. Craig, Jr.
ATTORNEY United States Patent Office 3,110,953
Patented Nov. 19, 1963

3,110,953
METHOD FOR THE PRODUCTION OF ROUND, PROFILED MOULDINGS, PARTICULARLY FOR BALL BEARING RACES
Sebastian Messerschmidt, Altstadstrasse 5, Schweinfurt, Germany
Filed Feb. 25, 1960, Ser. No. 10,926
Claims priority, application Germany Feb. 27, 1959
3 Claims. (Cl. 29—148.4)

The invention relates to a method for the production of ball bearing races and other circular, profiled mouldings.

Hitherto ball bearing races were generally produced from rod stock. This entailed a number of time-wasting working operations. The rods had to be externally faced on a lathe and centrally drilled. In addition the space between the outer race and the inner race had to be produced by cutting off. This method of production is open to the objection that it not only necessitates a considerable amount of time and work but also results in a considerable waste of material.

These objections can be overcome in a simple and advantageous manner if in the production of ball bearing races and similar mouldings a ball is taken according to the invention as initial material and this is shaped by pressing into a moulded blank which requires no subsequent external machining. It is advisable to use a geometrically accurately ground ball. Balls of this kind, such as are used for example in ball bearings, can today be produced very economically and accurately. Consequently it is possible to shape the balls in a tool having a bore corresponding approximately to the diameter of the ball, and pressing them between two press dies movable towards and away from each other, thereby producing a moulding which corresponds in diameter to the outer ball race of the bearing, whereby between the outer race and the inner race a web or smaller intermediate ring connecting the outer and inner races and an inner disc in the inner race are produced. It is then only necessary after the pressing operation to remove this inner disc by drilling and the intermediate ring by cutting out.

The invention is based on the knowledge that, according to the standardization of ball bearings, the volume of the inner ball race and of the outer ball race is somewhat smaller than the volume of a ball having the same diameter as the outer race of the ball bearing. This difference in volume constitutes the material of the intermediate ring and the inner disc formed in the pressing operation.

In addition to the advantages already mentioned, namely that according to the invention considerably less work and time are required than when employing the former methods of production, the fact that a considerable saving in material is achieved represents a special advantage in view of the large number of balls used in the case of series production.

Two embodiments of the invention are illustrated by way of example in the accompanying drawings, in which FIG. 1 is a section through an apparatus for carrying out the method of production according to the invention;

FIG. 2 shows on a smaller scale a moulded blank produced with the apparatus illustrated in FIG. 1 when manufacturing ball bearing races;

FIG. 3 illustrates the production of ball bearing races having the same dimensions as those produced from the blank illustrated in FIG. 2, from solid material by the former method of production, and FIG. 4 shows a modified form of construction of apparatus for the production of ball races according to the method of the invention.

For the production of ball bearing races and similar moulded blanks according to the invention, a ball $a$ is used as initial material which is manufactured in the manner customary in the case of balls for ball bearings, that is it is geometrically accurately ground.

The ball $a$ is inserted and shaped in a tool $b$ provided with a bore $c$. The diameter of the ball $a$ is, at the most, equal to the diameter of the bore $c$. It may even be smaller.

In the bore $c$ two press dies $d'$ and $d^2$ are movable towards and away from each other and profiled according to the moulded blank to be produced. In the example illustrated the two press dies are designed for producing the two ball races of a ball bearing.

After the pressing operation a moulded blank such as that illustrated in FIG. 2 is produced which consists of an inner ball race $e$, an outer ball race $f$, an intermediate ring $g$ connecting the two ball races and an inner disc $h$ in the inner ball race $e$. In order to produce a finished ball bearing it is therefore only necessary to remove the inner disc $h$ by means of a drill $i$ and the intermediate ring $g$ by means of a tool $k$.

As shown in FIG. 3, it was hitherto necessary to employ not only a drill $l$ for producing the bore in the inner race and the tool $m$ for separating the two races but also a tool $n$ for turning the outer surface of the outer race and a parting tool $o$ for cutting the two races off the rod stock. This resulted in a greater waste of material. This is clearly shown in the drawing wherein the waste material is emphasized by cross-hatching both in FIG. 2 and also in FIG. 3. As can be seen the depth to which the drill and the cutting out tool have to penetrate is far greater than in the method according to the invention.

As already mentioned, the ball $a$ used as initial material need not be as large as the internal diameter of the bore $c$. The important factor is always that it corresponds volumetrically to the moulded blank illustrated in FIG. 2.

If the ball is smaller than the bore $c$, a tool such as that illustrated in FIG. 4 is appropriate, which consists of three holding plungers $p$ which support the ball in axially central position until the beginning of the pressing operation and are then retracted as soon as the die $d'$, for example, engages the ball. At the same time it is advisable to allow the die $d'$ to remain as shown in dot-dash lines, so that the moulded blank is formed laterally of the guide for the ball holders $p$.

The method above described can be carried out advantageously by the cold pressing process.

I claim:

1. A method for the production of moulded ball bearing races comprising the selection of a geometrically accurately ground ball as basic material, pressing said ball into a moulded blank of a shape requiring only internal machining finishing operations, said blank comprising the inner race of said ball bearing and a disc within and spaced from the opposite end faces of said inner race, and further comprising the outer race of said ball bearing, said inner race being spaced from said outer race by an intermediate ring.

2. A method for the production of the inner and outer ball races of a ball bearing, consisting in pressing a geometrically accurate ball having a diameter corresponding to the diameter of the outer ball race, into a moulded blank comprising an outer race member having a radially inwardly facing portion and an inner race member having a portion outwardly facing said inwardly facing portion, an intermediate ring connecting the two portions, and an inner disc in the bore of the inner race member, and cutting out the intermediate ring between the two portions and drilling out the inner disc from the inner race member.

3. A method for the production of circular, profiled mouldings, especially ball bearing races, consisting in employing a geometrically accurately ground ball as initial material and pressing said ball into a moulded blank of a shape requiring only internal machining thereof to produce said races in a finished condition, said ball bearing introduced into a tool having a bore of larger diameter than that of said ball and being held in axially central position in said bore by holding members disposed radially of said ball, said holding members being retracted from said bore at the commencement of the ball-pressing operation, said ball being pressed to form a moulded blank comprising the outer and inner ball races of the ball bearing to be produced, an intermediate ring connecting a radially inwardly facing portion of said outer race to a radially outwardly facing portion of said inner race, an inner disc in the inner race, said method further comprising a cutting out operation upon said intermediate ring and a drilling out operation upon said inner disc.

References Cited in the file of this patent

UNITED STATES PATENTS

| | | |
|---|---|---|
| 1,039,673 | Schatz | Sept. 24, 1912 |
| 1,082,910 | Rockwell | Dec. 30, 1913 |
| 1,431,183 | Rockwell | Oct. 10, 1922 |
| 1,971,083 | Schlaa | Aug. 21, 1934 |
| 2,231,556 | Arpin | Feb. 11, 1941 |
| 2,427,072 | Rubin | Sept. 9, 1947 |
| 2,669,769 | Peterson | Feb. 23, 1954 |
| 2,913,811 | Benson | Nov. 24, 1959 |

FOREIGN PATENTS

| | | |
|---|---|---|
| 330,840 | Great Britain | June 19, 1930 |